United States Patent
Singh et al.

(10) Patent No.: US 11,374,842 B1
(45) Date of Patent: *Jun. 28, 2022

(54) SYSTEMS AND METHODS FOR DEBUGGING NETWORK STACKS BASED ON EVIDENCE COLLECTED FROM SELECTIVE TRACING

(71) Applicant: Juniper Networks, inc., Sunnyvale, CA (US)

(72) Inventors: Prashant Singh, Santa Clara, CA (US); Sreekanth Rupavatharam, Campbell, CA (US)

(73) Assignee: Juniper Networks, Inc, Sunnyvale, CA (US)

( * ) Notice: Subject to any disclaimer, the term of this patent is extended or adjusted under 35 U.S.C. 154(b) by 18 days.

This patent is subject to a terminal disclaimer.

(21) Appl. No.: 16/940,422

(22) Filed: Jul. 28, 2020

Related U.S. Application Data

(63) Continuation of application No. 16/000,483, filed on Jun. 5, 2018, now Pat. No. 10,797,983.

(51) Int. Cl.
| | |
|---|---|
| *H04L 43/10* | (2022.01) |
| *H04L 43/0829* | (2022.01) |
| *G06F 11/36* | (2006.01) |
| *H04L 9/40* | (2022.01) |
| *G06F 8/65* | (2018.01) |

(52) U.S. Cl.
CPC ............... *H04L 43/10* (2013.01); *G06F 8/65* (2013.01); *G06F 11/3636* (2013.01); *H04L 43/0829* (2013.01); *H04L 63/0263* (2013.01)

(58) Field of Classification Search
CPC . H04L 43/10; H04L 43/0829; H04L 63/0263; G06F 8/65; G06F 11/3636
See application file for complete search history.

(56) References Cited

U.S. PATENT DOCUMENTS

| 8,040,798 B2 | 10/2011 | Chandra et al. |
| 2012/0185734 A1 | 7/2012 | Gilkerson et al. |

(Continued)

OTHER PUBLICATIONS

Non-Final Office Action received for U.S. Appl. No. 16/000,483 dated Mar. 16, 2020, 17 pages.

(Continued)

*Primary Examiner* — Joe Chacko
(74) *Attorney, Agent, or Firm* — FisherBroyles, LLP

(57) ABSTRACT

A disclosed method may include (1) determining that a packet traversing a network device has been selected for conditional tracing by (A) comparing a characteristic of the packet against a firewall rule that calls for all packets exhibiting the characteristic to be conditionally debugged while traversing the network device and (B) determining, based at least in part on the comparison, that the firewall rule applies to the packet due at least in part to the packet exhibiting the characteristic, (2) tracing a journey of the packet within the network device in response to the determination by collecting information about the packet's journey through a network stack of the network device, and then (3) performing at least one action on the network device based at least in part on the information collected about the packet's journey through the network stack. Various other systems, methods, and computer-readable media are also disclosed.

20 Claims, 6 Drawing Sheets

(56) References Cited

U.S. PATENT DOCUMENTS

| | | | |
|---|---|---|---|
| 2015/0256397 A1* | 9/2015 | Agarwal | H04L 49/25 370/254 |
| 2018/0095815 A1 | 4/2018 | Kh et al. | |
| 2018/0227209 A1 | 8/2018 | Lin | |
| 2018/0309724 A1 | 10/2018 | Kfir et al. | |
| 2019/0149512 A1 | 5/2019 | Sevinc et al. | |
| 2019/0229977 A1 | 7/2019 | Bisht et al. | |
| 2020/0036624 A1 | 1/2020 | Michael et al. | |

OTHER PUBLICATIONS

Notice of Allowance received for U.S. Appl. No. 16/000,483 dated Jun. 19, 2020, 16 pages.

* cited by examiner

Firewall Rule
122(1)

```
iptables -A INPUT/OUTPUT -p icmp -j MARK --set-mark 0x80000000
```

*FIG. 4*

SYSTEMS AND METHODS FOR DEBUGGING NETWORK STACKS BASED ON EVIDENCE COLLECTED FROM SELECTIVE TRACING

CROSS REFERENCE TO RELATED APPLICATION

This application is a continuation of U.S. application Ser. No. 16/000,483 filed 5 Jun. 2018, the disclosure of which is incorporated, in its entirety, by this reference.

BACKGROUND

When computing devices exhibit software bugs and/or deficiencies, debugging is often used to fix the software bugs and/or improve the deficiencies. Debugging may involve several steps that facilitate those goals. For example, in the event that a network device is unexpectedly dropping packets, a debugging tool (whether running remotely or locally) may implement a debugging process to correct the underlying issue(s) causing the unexpected packet drops. In this example, one important step in the debugging process may involve collecting information about the dropped packets by tracing those packets' journeys through the network stack.

Unfortunately, traditional tracing technologies may have several downsides and/or deficiencies. For example, a traditional tracing technology may cause tracing to be performed indiscriminately on all packets that hit functions with any form of tracing code within the network stack. Many functions may include such code. As a result, these packets may lead to an unwieldly number of traces, thereby potentially consuming limited computing power and resources. Moreover, this unwieldly number of traces may significantly complicate and/or prolong the debugging process.

The instant disclosure, therefore, identifies and addresses a need for additional and improved systems and methods for debugging network stacks based on evidence collected from selective tracing.

SUMMARY

As will be described in greater detail below, the instant disclosure generally relates to systems and methods for debugging network stacks based on evidence collected from selective tracing. In one example, a method for accomplishing such a task may include (1) determining that a packet traversing a network device has been selected for conditional tracing by (A) comparing at least one characteristic of the packet against at least one firewall rule that calls for all packets exhibiting the characteristic to be conditionally traced while traversing the network device and (B) determining, based at least in part on the comparison, that the firewall rule applies to the packet due at least in part to the packet exhibiting the characteristic, (2) tracing a journey of the packet within the network device in response to the determination by collecting information about the packet's journey through a network stack of the network device, and then (3) performing at least one action on the network device based at least in part on the information collected about the packet's journey through the network stack.

Similarly, a system that implements the above-described method may include various modules stored in memory and at least one physical processor that executes those modules. For example, such a system may include (1) a firewall module that determines that a packet traversing a network device has been selected for conditional tracing by (A) comparing at least one characteristic of the packet against at least one firewall rule that calls for all packets exhibiting the characteristic to be conditionally traced while traversing the network device and (B) determining, based at least in part on the comparison, that the firewall rule applies to the packet due at least in part to the packet exhibiting the characteristic, (2) a tracing module that traces, in response to the determination, a journey of the packet within the network device by collecting information about the packet's journey through a network stack of the network device, and (3) a remedy module that performs at least one action on the network device based at least in part on the information collected about the packet's journey through the network stack.

In addition, the above-described method may be encoded as computer-readable instructions on a non-transitory computer-readable medium. For example, a computer-readable medium may include one or more computer-executable instructions that, when executed by at least one physical processor of a computing device, may cause the computing device to (1) determine that a packet traversing a network device has been selected for conditional tracing by (A) comparing at least one characteristic of the packet against at least one firewall rule that calls for all packets exhibiting the characteristic to be conditionally traced while traversing the network device and (B) determining, based at least in part on the comparison, that the firewall rule applies to the packet due at least in part to the packet exhibiting the characteristic, (2) trace a journey of the packet within the network device in response to the determination by collecting information about the packet's journey through a network stack of the network device, and then (3) perform at least one action on the network device based at least in part on the information collected about the packet's journey through the network stack.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 4 is an illustration of an exemplary firewall rule that facilitates selective tracing of packets.

Figure 1:
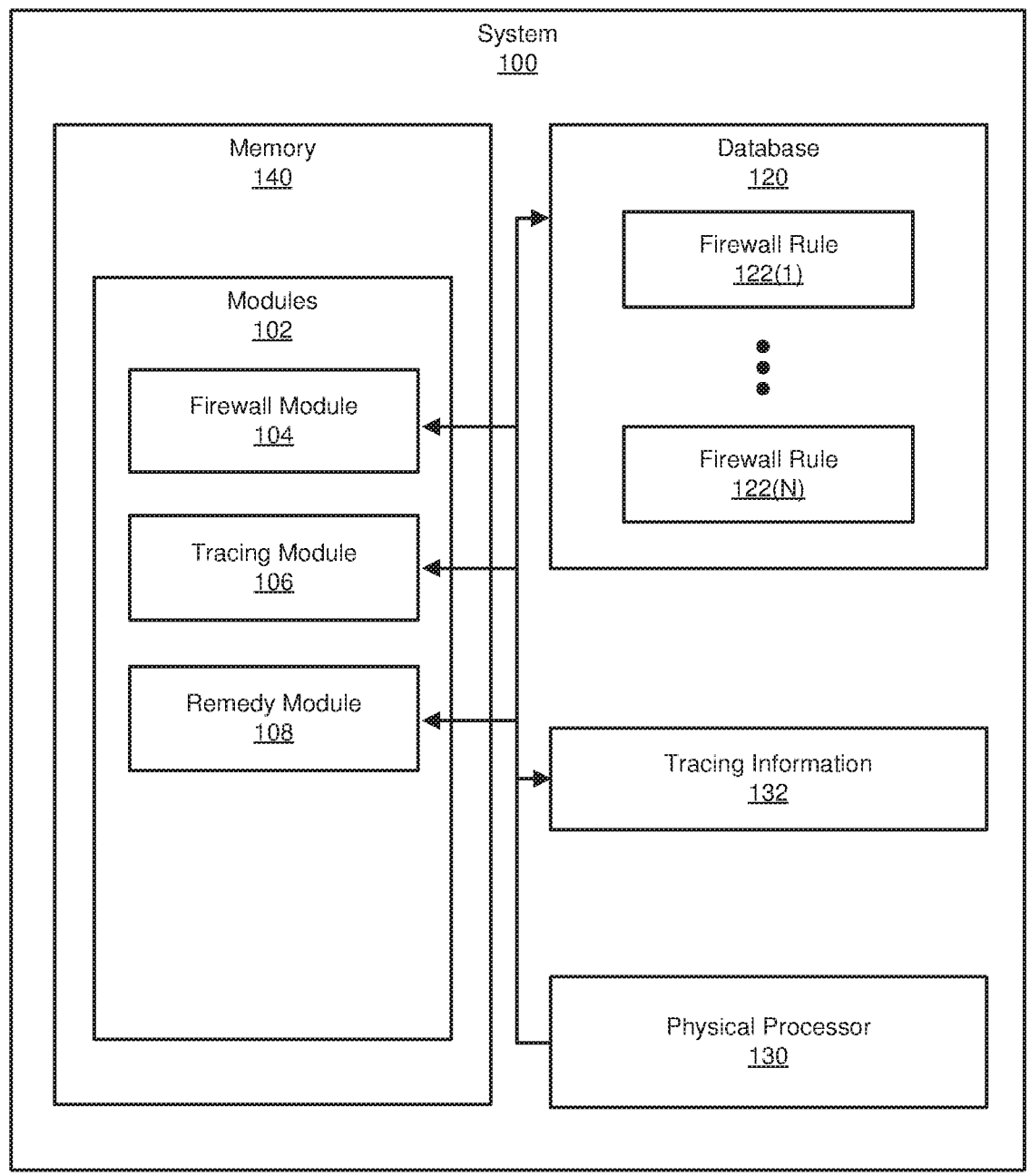
FIG. 1 is a block diagram of an exemplary system for debugging network stacks based on evidence collected from selective tracing.

Throughout the drawings, identical reference characters and descriptions indicate similar, but not necessarily identical, elements. While the exemplary embodiments described herein are susceptible to various modifications and alternative forms, specific embodiments have been shown byway of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various systems and methods for debugging network stacks based on evidence collected from selective tracing. The term "tracing" and the phrase "to trace," as used herein, generally refer to any technique, process, and/or procedure that facilitates collecting information about a packet's path and/or journey through at least a portion of a computing device and/or system. The terms "selective tracing" and "conditional tracing" as well as the phrases "to selectively trace" and "to conditionally trace," as used herein, generally refer to any tracing technique, process, and/or procedure that is selectively and/or conditionally applied only to packets that satisfy one or more criteria. In one example, a packet whose characteristics match certain criteria of a firewall rule may be subjected to tracing that corresponds to that firewall rule. However, in this example, a packet whose characteristics do not match the criteria of that firewall rule may bypass and/or avoid any tracing that corresponds to that firewall rule.

Selective and/or conditional tracing may be performed in a variety of ways and/or contexts. For example, selective and/or conditional tracing may involve collecting information about a packet or computing environment via one or more tracing points and/or hooks incorporated into functions called as the packet traverses the computing environment. Additionally or alternatively, selective tracing may involve engaging and/or implementing certain tracing tools, such as DTRACE and/or FTRACE, that carry out the packet-tracing functionality.

As will be explained in greater detail below, embodiments of the instant disclosure may detect a certain computing event in connection with a first packet traversing a network device. In response to the detection of this computing event, embodiments of the instant disclosure may identify one or more characteristics of the first packet and then create a firewall rule that calls for all subsequent packets exhibiting such characteristics to be conditionally traced while traversing the network device.

After creation of the firewall rule, embodiments of the instant disclosure may identify a second packet traversing the network device. Upon identifying the second packet, embodiments of the instant disclosure may determine that the firewall rule applies to the second packet due at least in part to the second packet exhibiting the same characteristics as the first packet. In response to this determination, embodiments of the instant disclosure may trace the second packet within the network device by collecting information about the second packet's journey through the device's network stack. Embodiments of the instant disclosure may then perform one or more actions on the network device in an effort to fix the underlying problem that contributed and/or led to the computing event detected in connection with the first packet.

By implementing selective tracing in this way, embodiments of the instant disclosure may enable a debugger and/or tracer to find and/or locate diagnostically relevant information about packets' journeys through the network stack. For example, embodiments of the instant disclosure may eliminate the need to pass and/or use the pointer to the socket buffer (e.g., LINUX's "skbuff" structure) for checking packets' contents and/or determining or indicating whether packets have been selected for conditional tracing. Such pointer passing and/or usage may lead to the loss of certain information, such as the indication of a packet's selection for conditional tracing. Moreover, such pointers may be difficult to manage and/or track within the network stack due at least in part to certain functions incrementing or decrementing the pointers' values and/or headers being popped from the packets.

Figure 2:
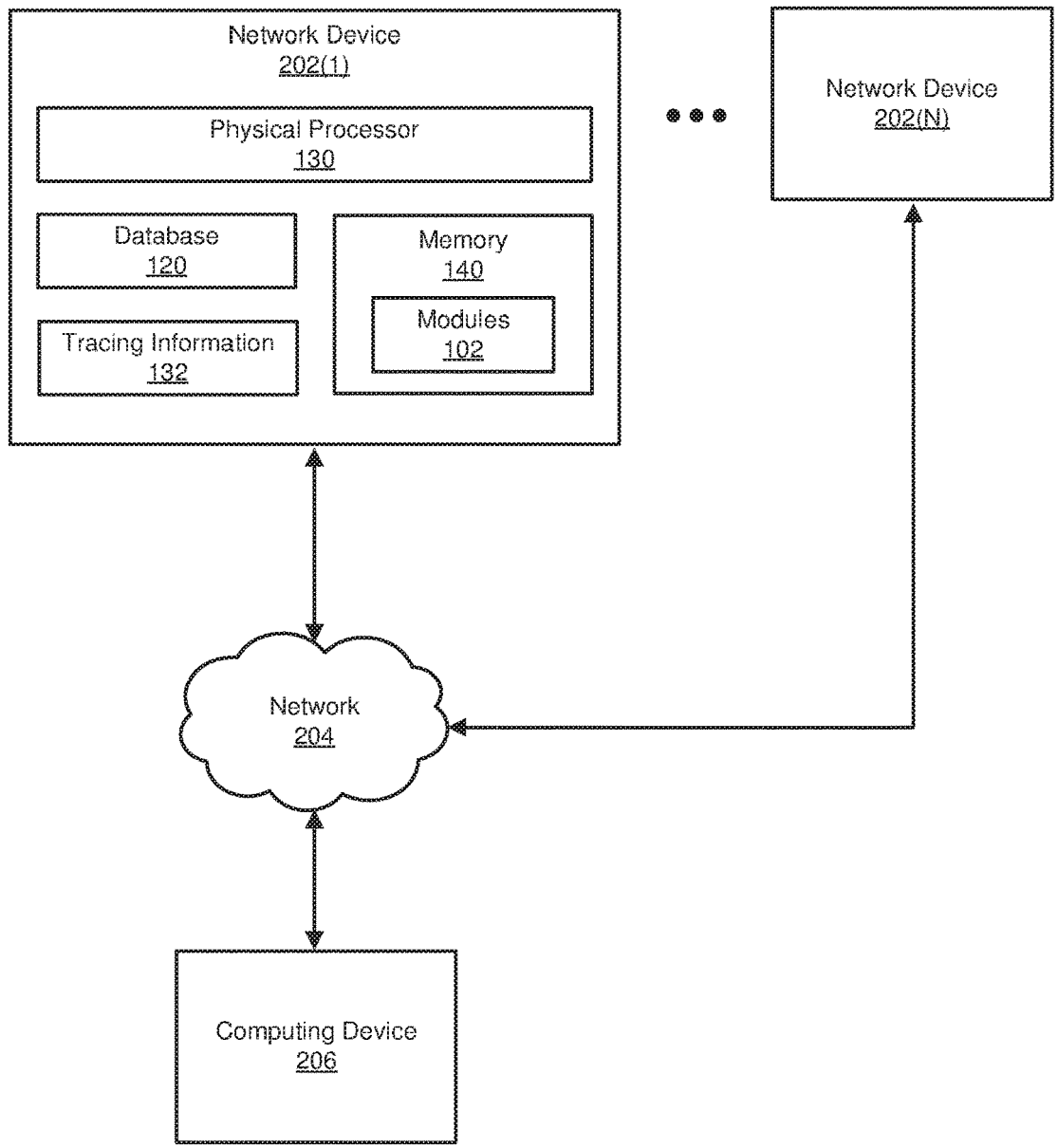
FIG. 2 is a block diagram of an exemplary system for debugging network stacks based on evidence collected from selective tracing.
Figure 5:
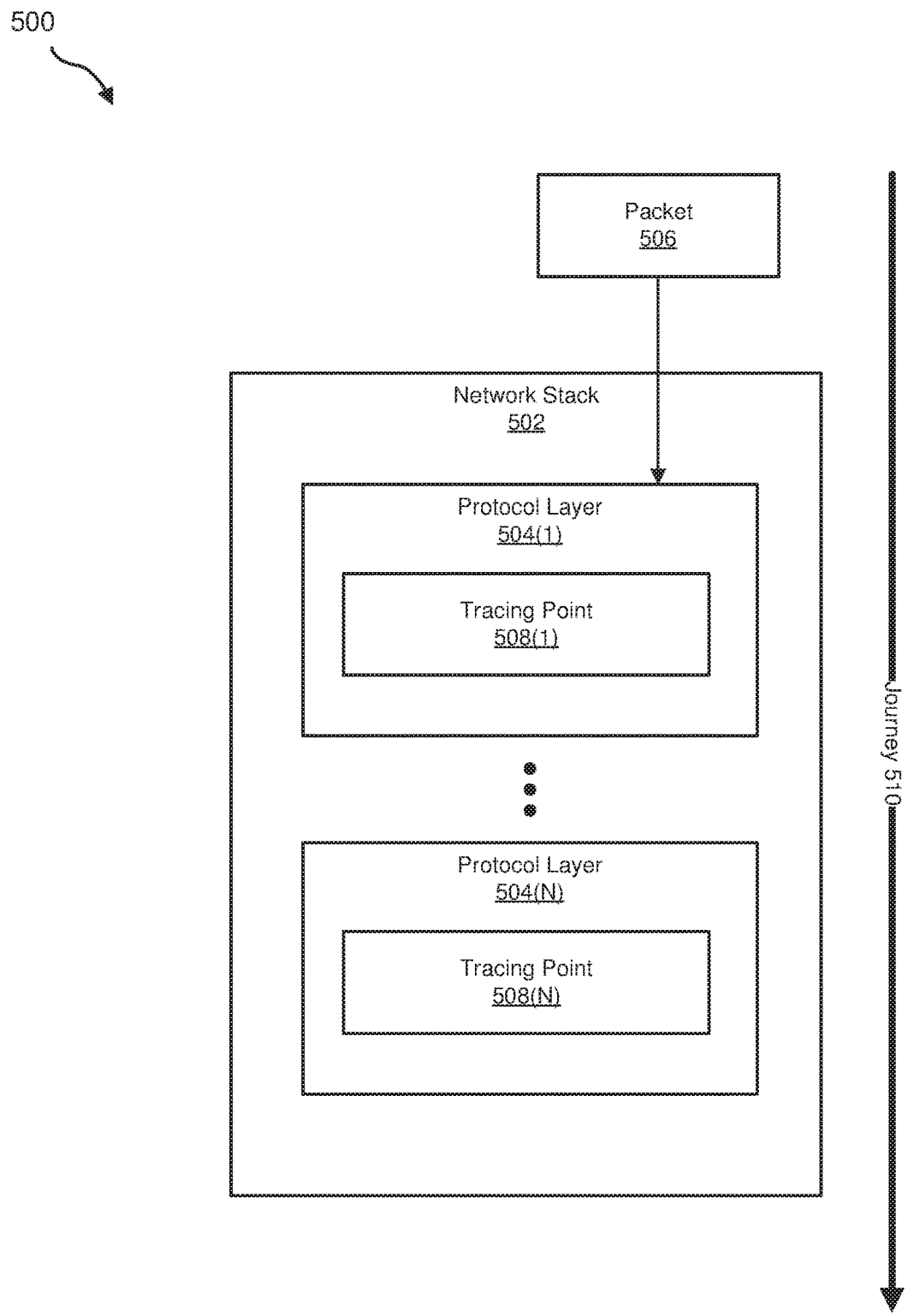
FIG. 5 is a block diagram of an exemplary journey of a packet traversing a network stack.

The following will provide, with reference to FIGS. 1, 2, and 5, examples of systems and corresponding components that facilitate debugging network stacks based on evidence collected from selective tracing. The discussions corresponding to FIG. 4 will describe an exemplary firewall rule that facilitates selective tracing of packets. The discussions corresponding to FIG. 3 will describe exemplary methods for debugging network stacks based on evidence collected from selective tracing. Finally, the discussions corresponding to FIG. 6 will provide numerous examples of systems and/or devices that may carry out the debugging and/or selective tracing.

FIG. 1 shows an exemplary system 100 that facilitates debugging network stacks based on evidence collected from selective tracing. As illustrated in FIG. 1, system 100 may include one or more modules 102 for performing one or more tasks. As will be explained in greater detail below, modules 102 may include a firewall module 104, a tracing module 106, and a remedy module 108. Although illustrated as separate elements, one or more of modules 102 in FIG. 1 may represent portions of a single module or application (such as an operating system, a firewall utility, a tracing tool, and/or a debug tool).

In certain embodiments, one or more of modules 102 in FIG. 1 may represent one or more software applications or programs that, when executed by a computing device, cause the computing device to perform one or more tasks. For example, and as will be described in greater detail below, one or more of modules 102 may represent modules stored and configured to run on one or more computing devices, such as the devices illustrated in FIG. 2 (e.g., network devices 202(1)-(N) and/or computing device 206). One or more of modules 102 in FIG. 1 may also represent all or portions of one or more special-purpose computers configured to perform one or more tasks.

As illustrated in FIG. 1, exemplary system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, exemplary system 100 may also include one or more physical processors, such as physical processor 130. Physical processor 130 generally represents any type or form of hardware-implemented processing device capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate debugging network stacks based on evidence collected from selective tracing. Examples of physical processor 130 include, without limitation, microprocessors, microcontrollers, Central Processing Units (CPUs), Field-Programmable Gate Arrays (FPGAs) that implement soft-core processors, Application-Specific Integrated Circuits (ASICs), portions of one or more of the same, variations or combinations of one or more of the same, and/or any other suitable physical processor.

As illustrated in FIG. 1, exemplary system 100 may further include one or more databases, such as database 120. In some examples, database 120 may include and/or represent any collection and/or compilation of data and/or information stored in connection with at least one computing device and/or network. In one example, database 120 may include firewall rules 122(1)-(N). In this example, firewall rules 122(1)-(N) may define how to treat and/or handle certain packets within a computing device. For example, firewall rule 122(1) may call for all packets exhibiting certain characteristics to be conditionally traced while traversing a network stack of a network device. Examples of such characteristics include, without limitation, network protocols, communication protocols, source ports, destination ports, source Internet Protocol (IP) addresses, destination IP addresses, header flags, metadata, types of payload content, variations or combinations of one or more of the same, and/or any other suitable characteristics.

In some examples, database 120 and/or firewall rules 122(1)-(N) may be installed and/or stored in a firewall utility. In one example, this firewall utility may represent a portion of an operating system running on the computing device. For example, firewall rules 122(1)-(N) may be installed and/or stored in IPTABLES of a LINUX operating system kernel. IPTABLES may represent a user-space utility and/or tool implemented by and/or maintained via a NETFILTER framework and/or infrastructure of the UNUX operating system.

As illustrated in FIG. 1, exemplary system 100 may additionally include various information, such as tracing information 132. In some examples, tracing information 132 may include and/or represent any data and/or information about a path and/or journey of a packet within a computing environment. For example, tracing information 132 may identify certain functions that were called in connection with a packet as the packet traversed a network stack of a network device. Additionally or alternatively, tracing information 132 may identify certain points and/or markers along the packet's path and/or journey through the network stack. Tracing information 132 may include and/or represent one or more backtraces and/or stack traces of function calls made in connection with the packet's path and/or journey through the network stack.

Exemplary system 100 in FIG. 1 may be implemented in a variety of ways. For example, all or a portion of exemplary system 100 may represent portions of exemplary system 200 in FIG. 2. As shown in FIG. 2, system 200 may include network devices 202(1)-(N) in communication with a computing device 206 via a network 204. In one example, all or a portion of the functionality of modules 102 may be performed by one or more of network devices 202(1)-(N), computing device 206, and/or any other suitable computing system. For example, and as will be described in greater detail below, one or more of modules 102 from FIG. 1 may, when executed by at least one processor of network devices 202(1) in FIG. 2, enable network devices 202(1)-(N) and/or computing device 206 to debug network stacks based on evidence collected from selective tracing.

For example, and as will be described in greater detail below, one or more of modules 102 may cause network device 202(1) to (1) determine that a packet traversing network device 202(1) has been selected for conditional tracing by (A) comparing at least one characteristic of the packet against at least one firewall rule that calls for all packets exhibiting the characteristic to be conditionally traced while traversing network device 202(1) and (B) determining, based at least in part on the comparison, that the firewall rule applies to the packet due at least in part to the packet exhibiting the characteristic, (2) trace, in response to the determination, a journey of the packet within network device 202(1) by collecting information about the packet's journey through a network stack of network device 202(1), and then (3) perform at least one action on network device 202(1) based at least in part on the information collected about the packet's journey through the network stack.

Network devices 202(1)-(N) each generally represent any type or form of physical computing device capable of reading computer-executable instructions and/or handling network traffic. In one example, network devices 202(1)-(N) may each include and/or represent a router (such as a provider edge router, hub router, spoke router, autonomous system boundary router, and/or area border router) that receives, routes, forwards, and/or otherwise handles network traffic. Additional examples of network devices 202(1)-(N) include, without limitation, switches, hubs, modems, bridges, repeaters, gateways, multiplexers, network adapters, network interfaces, laptops, tablets, desktops, servers, cellular phones, Personal Digital Assistants (PDAs), multimedia players, embedded systems, wearable devices, gaming consoles, variations or combinations of one or more of the same, and/or any other suitable network devices.

Network 204 generally represents any medium or architecture capable of facilitating communication or data transfer. In one example, network 204 may facilitate communication between network devices 202(1)-(N). In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network. Although illustrated as being external to network 204 in FIG. 2, network devices 202(1)-(N) may each represent a portion of network 204 and/or be included in network 204.

Figure 3:
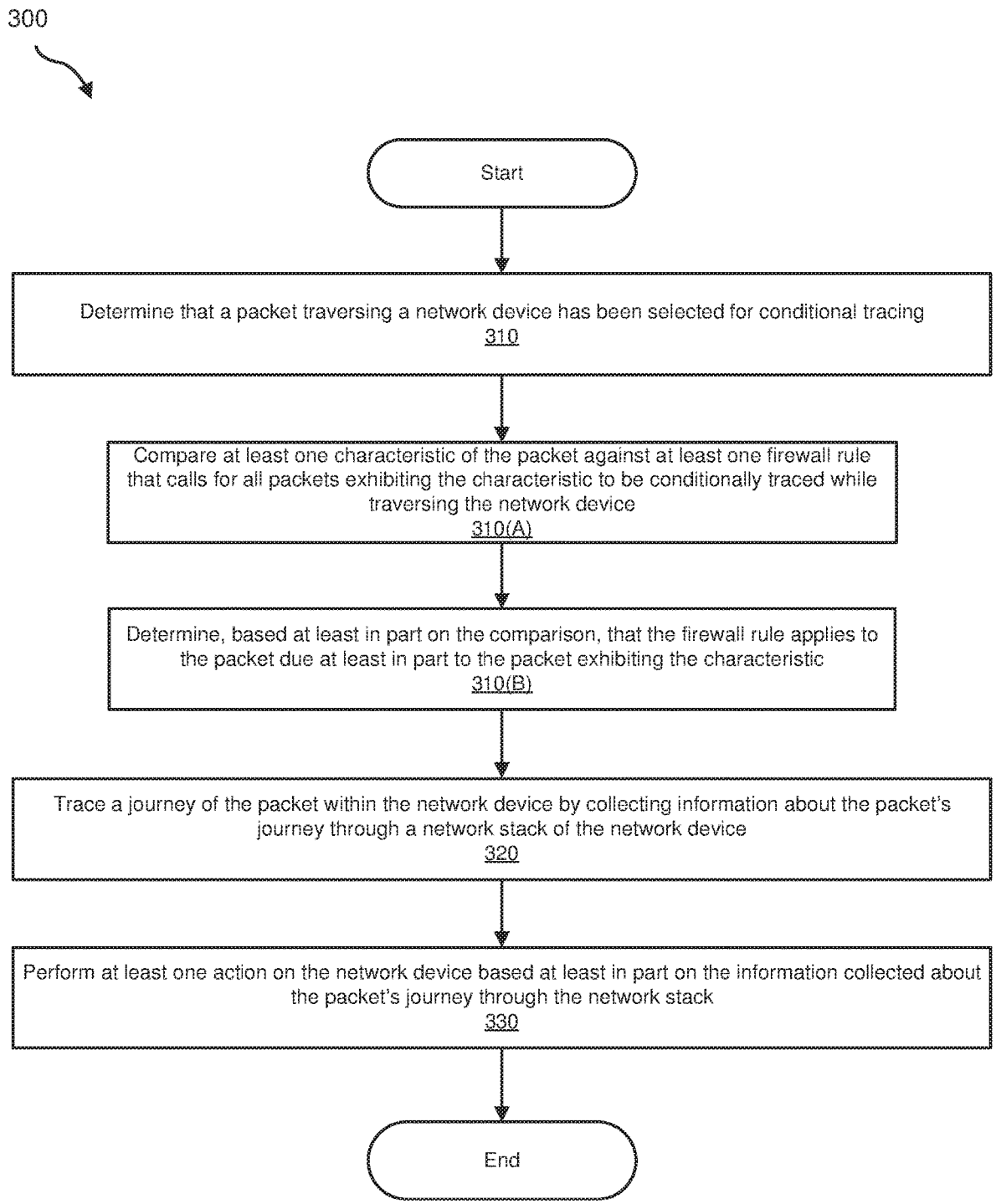
FIG. 3 is a flow diagram of an exemplary method for debugging network stacks based on evidence collected from selective tracing.

FIG. 3 is a flow diagram of an exemplary computer-implemented method 300 for debugging network stacks based on evidence collected from selective tracing. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310 one or more of the systems described herein may determine that a packet traversing a network device has been selected for conditional tracing. For example, firewall module 104 may, as part of network device 202(1) in FIG. 2 and/or another device not illustrated in FIG. 2, determine that a packet traversing network device 202(1) has been selected for conditional tracing. In other words, this packet may satisfy certain criteria that triggers such conditional tracing.

The systems described herein may perform step 310 in a variety of ways and/or contexts. As further illustrated in FIG. 3, at sub-step 310(A) one or more of the systems described herein may compare at least one characteristic of the packet against at least one firewall rule that calls for all packets exhibiting the characteristic to be conditionally traced while traversing the network device. For example, firewall module 104 may, as part of network device 202(1) in FIG. 2 and/or another device not illustrated in FIG. 2, compare the characteristic of the packet against one or more of firewall rules 122(1)-(N). In this example, one or more of firewall rules 122(1)-(N) may call for all packets exhibiting that characteristic to be conditionally traced while traversing network device 202(1).

At sub-step 310(B), one or more of the systems described herein may determine, based at least in part on the comparison, that firewall rule 122(1) applies to the packet due at least in part to the packet exhibiting the characteristic identified in firewall rule 122(1). For example, firewall module 104 may, as part of network device 202(1) in FIG. 2 and/or another device not illustrated in FIG. 2, determine that firewall rule 122(1) applies to the packet because the packet exhibits the characteristic identified in firewall rule 122(1). In this example, one or more of firewall rules 122(1)-(N) may call for all packets exhibiting that characteristic to be conditionally traced while traversing network device 202(1).

Firewall rules 122(1)-(N) may be created and/or implemented in a variety of ways and/or contexts. In some examples, one or more of the systems described herein may create firewall rules 122(1)-(N) in response to certain computing events that occur on network device 202(1). For example, a debug engineer and/or a debug tool may monitor the performance and/or functionality of network device 202(1). While monitoring the performance and/or functionality of network device 202(1), the debug engineer and/or debug tool may detect a computing event of interest in connection with one or more packets traversing network device 202(1).

In some examples, the computing event of interest may represent any occurrence and/or evidence indicative of a software bug and/or performance deficiency of network device 202(1). In one example, the computing event of interest may amount to any suspicious action, transaction, and/or interaction detected in connection with one or more packets traversing network device 202(1). For example, one computing event of interest may be unexpected and/or silent packet drops. In this example, such unexpected and/or silent packet drops may indicate and/or suggest that network device 202(1) is suffering from a software bug and/or performance deficiency.

In some examples, the debug engineer and/or debug tool may identify one or more characteristics about the packet corresponding to the computing event of interest. The debug engineer and/or debug tool may then create firewall rule 122(1). In one example, firewall rule 122(1) may call for and/or cause all packets exhibiting those characteristics to be conditionally traced while traversing network device 202(1).

In some examples, firewall rule 122(1) may include and/or identify various information about how to treat, handle, and/or trace packets that satisfy certain criteria. In one example, firewall rule 122(1) may include and/or specify an identifier used to determine whether to conditionally trace packets traversing network device 202(1). Additionally or alternatively, firewall rule 122(1) may include and/or identify a directive and/or instruction indicating specific information to collect about the packet's journey through the network stack of network device 202(1).

In some examples, the identifier included in firewall rule 122(1) may effectively amount to and/or be represented as a specific mark and/or stamp. In one example, the mark and/or stamp included and/or identified in firewall rule 122(1) may be represented as a 32-bit unsigned integer field in a LINUX socket buffer structure (e.g., the "skbuff" structure). For example, the "mark" field of the LINUX socket buffer may be used for and/or serve as the mark and/or stamp indicating whether to conditionally trace packets traversing network device 202(1). As will be described in greater detail below, the mark and/or stamp may be applied to packets of interest by way of a LINUX NETFILTER framework and/or infrastructure. In some examples, the mark and/or stamp may be copied and/or cloned from the packet to the LINUX socket buffer.

In one example, this mark and/or stamp may correspond to and/or represent a reserved value. As illustrated in FIG. 4, exemplary firewall rule 122(1) may include and/or identify "0x80000000" as the mark or stamp (in this example, "iptables -A INPUT/OUTPUT -p icmp -j MARK --set-mark 0x80000000"). After the creation of firewall rule 122(1), firewall module 104 may detect a packet traversing network device 202(1). Firewall module 104 may search the packet for the "0x80000000" mark or stamp. During this search, firewall module 104 may identify the "0x80000000" mark or stamp in the packet's metadata.

In some examples, the directive included in firewall rule 122(1) may effectively amount to and/or be represented as a code and/or command indicating that any packet that satisfies the corresponding criteria of firewall rule 122(1) is subjected to selective and/or conditional tracing. In one example, the mark and/or stamp may also serve as the directive to trigger selective and/or conditional tracing. For example, all packets that satisfy the corresponding criteria of firewall rule 122(1) may be marked and/or stamped with "0x80000000". In this example, the "0x80000000" mark and/or stamp may trigger selective and/or conditional tracing for all such packets. In other words, selective and/or conditional tracing may be applied only to packets that satisfy the criteria of firewall rule 122(1) (or some additional firewall rule that triggers selective and/or conditional tracing).

Additionally or alternatively, the directive may effective limit the number of packets that are subjected to selective and/or conditional tracing. For example, the directive may direct firewall module 108 to only permit selective and/or conditional tracing on 1 out of every 100 packets that satisfy the criteria of firewall rule 122(1). As a result, the directive may conserve resources by preventing potentially redundant and/or superfluous tracing.

As a specific example, a debug engineer and/or debug tool may detect one or more unexpected packet drops occurring within the network stack on network device 202(1). In this example, the debug engineer and/or debug tool may notice and/or determine that the unexpected drops appear to be affecting only Internet Control Message Protocol (ICMP) packets. As a result, in an effort to debug the underlying cause of these unexpected packet drops, the debug engineer and/or debug tool may create firewall rule 122(1) that implements selective tracing only on ICMP packets. Thus, all non-ICMP packets may bypass and/or avoid tracing as they traverse network device 202(1) (unless tracing is triggered by, e.g., another firewall rule).

Continuing with this example, firewall module 104 may subsequently identify and/or detect an ICMP packet within network device 202(1). In response, firewall module 104 may determine that firewall rule 122(1) applies to this ICMP packet. As a result, firewall module 104 may mark and/or stamp the ICMP packet with "0x80000000" so that the ICMP packet is traced throughout the network stack of network device 202(1).

Returning to FIG. 3, at step 320 one or more of the systems described herein may trace a journey of the packet within the network device by collecting information about the packet's journey through a network stack of the network device. For example, tracing module 106 may, as part of network device 202(1) in FIG. 2 and/or another device not illustrated in FIG. 2, trace a journey of the packet within network device 202(1) by collecting information 132 about the packet's journey through a network stack of network device 202(1). Tracing module 106 may initiate this tracing of the packet's journey in response to the determination that the packet has been selected for conditional tracing. The term "journey," as used herein in connection with a packet, generally refers to a path traversed by a packet within a network stack, a sequence of protocol layers traversed by the packet within the network stack, and/or a sequence of function calls made in connection with the packet's traversal.

The systems described herein may perform step 320 in a variety of ways and/or contexts. In some examples, tracing module 106 may execute at least one function in connection with the packet as the packet traverses the network stack. For example, tracing module 106 may add a call to the function within the network stack to facilitate conditionally tracing all applicable packets throughout the network stack. In such examples, tracing module 106 may collect, via the function, at least a portion of tracing information 132 about the packet's journey through the network stack. Examples of tracing information 132 include, without limitation, logs associated with the packet, statistics associated with the packet, backtraces of the packet, function calls made in connection with the packet, protocol layers traversed by the packet, variations or combinations of one or more of the same, and/or any other information relevant to the packet's journey.

In one example, tracing module 106 may trace the function calls made in connection with the packet as the packet traverses the network stack. In this example, tracing module 106 may log function calls as the packet traverses the network stack. Tracing module 106 may incorporate that log of functions calls into tracing information 132 and then provide tracing information 132 to a debug tool for analysis.

In some examples, tracing module 106 may establish one or more tracing points throughout the network stack. In one example, tracing module 106 may collect at least a portion of tracing information 132 from one tracing point. In this example, tracing module 106 may collect another portion of tracing information 132 from a different tracing point. Tracing module 106 (or firewall module 104) may dynamically enable or activate such tracing points for packets selected for conditional tracing and/or dynamically disable or deactivate such tracing points for packets not selected for conditional tracing.

FIG. 5 illustrates an exemplary implementation 500 for debugging network stacks based on evidence collected from selective tracing. As a specific example, a packet 506 in FIG. 5 may traverse a network stack 502 in FIG. 5. In this example, packet 506 may have been selected for conditional tracing through network stack 502. In one example, packet 506 may be egressing out of network device 202(1). In another example, packet 506 may be ingressing into network device 202(1).

In some examples, network stack 502 may include and/or represent a set of protocol layers 504(1)-(N). In one example, protocol layers 504(1)-(N) may correspond to and/or represent at least a portion of the Open Systems Interconnection (OSI) protocol suite. Examples of protocol layers 504(1)-(N) include, without limitation, layer 1—physical layer, layer 2—data link layer, layer 3—network layer, layer 4—transport layer, layer 5—session layer, layer 6—presentation layer, layer 7—application layer, variations or combinations of one or more of the same, and/or any other suitable protocol layers.

As illustrated in FIG. 5, packet 506 may begin a journey 510 through network stack 502. Journey 510 may represent the path of packet 506 across and/or through at least some of protocol layers 504(1)-(N). Within protocol layer 504(1) of network stack 502, packet 506 may reach, hit, and/or encounter tracing point 508(1). In one example, tracing point 508(1) may represent a code segment incorporated in a function of protocol layer 504(1) and/or a function called by protocol layer 504(1). In this example, tracing point 508(1) may collect information about packet 506 within protocol layer 504(1) and/or report such information to a debug tool for analysis.

Similarly, within protocol layer 504(N) of network stack 502, packet 506 may reach, hit, and/or encounter tracing point 508(N). In one example, tracing point 508(N) may represent a code segment incorporated into a function of protocol layer 504(N) and/or a function called by protocol layer 504(N). In this example, tracing point 508(N) may collect information about packet 506 within protocol layer 504(N) and/or report such information to a debug tool for analysis.

In some examples, a debug engineer and/or a debug tool may analyze the information collected about packet 506 for the purpose of debugging network stack 502. For example, a debug engineer and/or a debug tool may identify each tracing point that packet 506 reached during journey 510 based at least in part on that information. In this example, the debug tool may also identify each tracing point that packet 506 failed to reach during journey 510 based at least in part on that information. In the event that packet 506 was dropped within network stack 502, the debug tool may determine precisely where packet 506 was dropped based on the last tracing point reached by packet 506 and the first tracing point not reached by packet 506. Additionally or alternatively, the debug tool may devise a certain action to perform on network stack 502 to fix and/or remedy the underlying cause of the drops based at least in part on that analysis.

Returning to FIG. 3, at step 330 one or more of the systems described herein may perform at least one action on the network device based at least in part on the information collected about the packet's journey through the network stack. For example, remedy module 108 may, as part of network device 202(1) in FIG. 2 and/or another device not illustrated in FIG. 2, perform at least one action on network device 202(1) based at least in part on tracing information 132. In this example, the action performed on network device 202(1) may be designed and/or intended to fix and/or remedy the underlying cause of the computing event of interest that led to the creation of firewall rule 122(1).

The systems described herein may perform step 330 in a variety of ways and/or contexts. In some examples, remedy module 108 may modify a portion of code within the network stack. For example, the computing event of interest that led to the creation of firewall rule 122(1) may have been one or more unexpected packet drops within the network stack. In this example, to remedy those unexpected packet drops, remedy module 108 may modify certain code included in at least one function called in connection with those unexpected packet drops.

In some examples, remedy module 108 may add one or more new functions to the existing framework of the network stack. In other examples, remedy module 108 may add one or more new code segments to existing functions within the framework of the network stack. In further examples, remedy module 108 may delete and/or remove one or more code segments from existing functions within the framework of the network stack. Remedy module 108 may also replace one or more functions or code segments with new functions or code segments.

Figure 6:
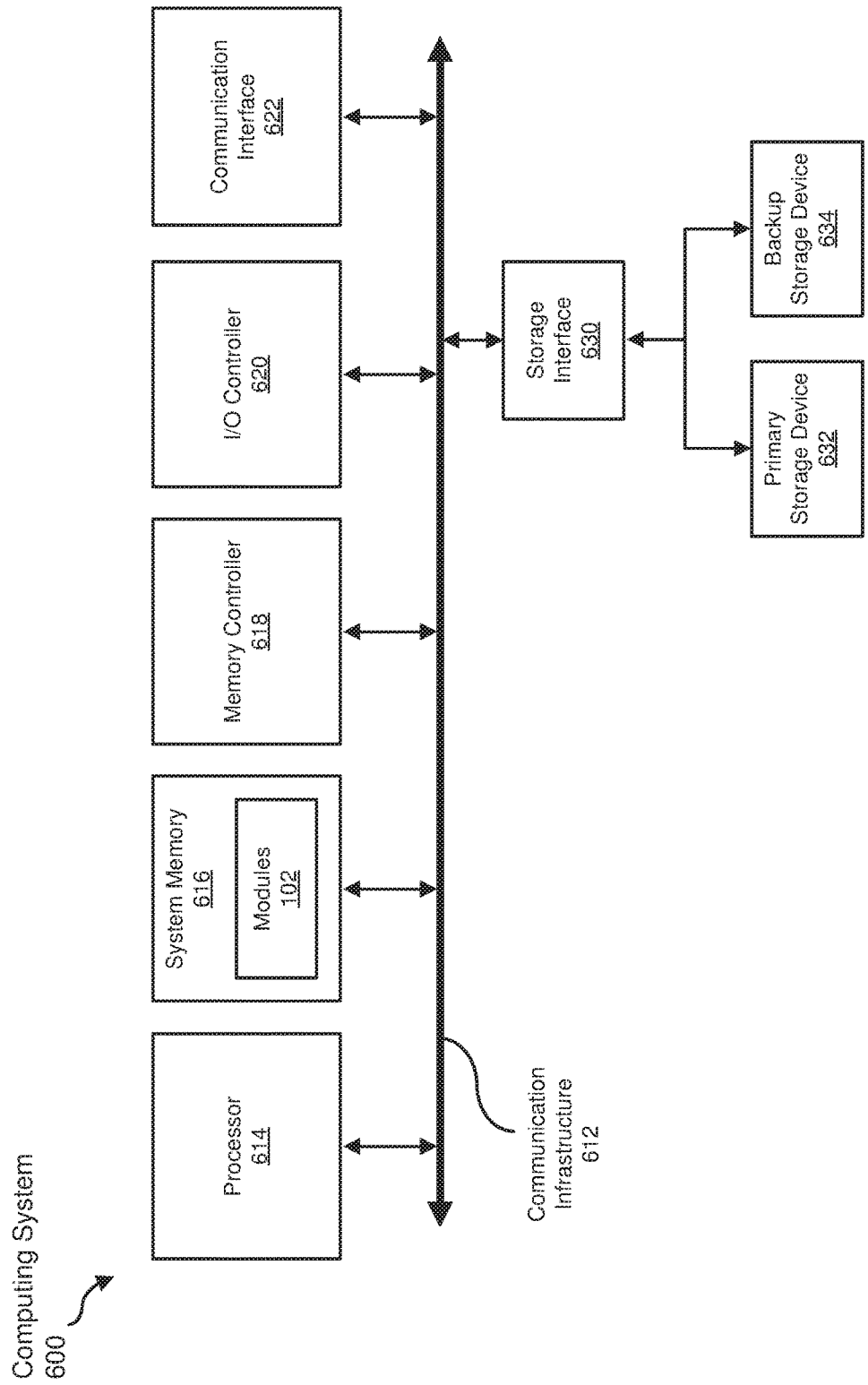
FIG. 6 is a block diagram of an exemplary computing system capable of implementing and/or being used in connection with one or more of the embodiments described and/or illustrated herein.

FIG. 6 is a block diagram of an exemplary computing system 600 capable of implementing and/or being used in connection with one or more of the embodiments described and/or illustrated herein. In some embodiments, all or a portion of computing system 600 may perform and/or be a means for performing, either alone or in combination with other elements, one or more of the steps described in connection with FIG. 3. All or a portion of computing system 600 may also perform and/or be a means for performing and/or implementing any other steps, methods, or processes described and/or illustrated herein. In one example, computing system 600 may include system 100 from FIG. 1.

Computing system 600 broadly represents any type or form of electrical load, including a single or multi-processor computing device or system capable of executing computer-readable instructions. Examples of computing system 600 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 600 may be programmed, configured, and/or otherwise designed to comply with one or more networking protocols. According to certain embodiments, computing system 600 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 600 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 600 may include various network and/or computing components. For example, computing system 600 may include at least one processor 614 and a system memory 616. Processor 614 generally represents any type or form of processing unit capable of processing data or interpreting and executing instructions. For example, processor 614 may represent an application-specific integrated circuit (ASIC), a system on a chip (e.g., a network processor), a hardware accelerator, a general purpose processor, and/or any other suitable processing element.

Processor 614 may process data according to one or more of the networking protocols discussed above. For example, processor 614 may execute or implement a portion of a protocol stack, may process packets, may perform memory operations (e.g., queuing packets for later processing), may execute end-user applications, and/or may perform any other processing tasks.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 600 may include both a volatile memory unit (such as, for example, system memory 616) and a non-volatile storage device (such as, for example, primary storage device 632, as described in detail below). System memory 616 may be implemented as shared memory and/or distributed memory in a network device. Furthermore, system memory 616 may store packets and/or other information used in networking operations.

In certain embodiments, exemplary computing system 600 may also include one or more components or elements in addition to processor 614 and system memory 616. For example, as illustrated in FIG. 6, computing system 600 may include a memory controller 618, an Input/Output (I/O) controller 620, and a communication interface 622, each of which may be interconnected via communication infrastructure 612. Communication infrastructure 612 generally represents any type or form of infrastructure capable of facilitating communication between one or more components of a computing device. Examples of communication infrastructure 612 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 618 generally represents any type or form of device capable of handling memory or data or controlling communication between one or more components of computing system 600. For example, in certain embodiments memory controller 618 may control communication between processor 614, system memory 616, and I/O controller 620 via communication infrastructure 612. In some embodiments, memory controller 618 may include a Direct Memory Access (DMA) unit that may transfer data (e.g., packets) to or from a link adapter.

I/O controller 620 generally represents any type or form of device or module capable of coordinating and/or controlling the input and output functions of a computing device.

For example, in certain embodiments I/O controller 620 may control or facilitate transfer of data between one or more elements of computing system 600, such as processor 614, system memory 616, communication interface 622, and storage interface 630.

Communication interface 622 broadly represents any type or form of communication device or adapter capable of facilitating communication between exemplary computing system 600 and one or more additional devices. For example, in certain embodiments communication interface 622 may facilitate communication between computing system 600 and a private or public network including additional computing systems. Examples of communication interface 622 include, without limitation, a link adapter, a wired network interface (such as a network interface card), a wireless network interface (such as a wireless network interface card), and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 622 may also represent a host adapter configured to facilitate communication between computing system 600 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also enable computing system 600 to engage in distributed or remote computing. For example, communication interface 622 may receive instructions from a remote device or send instructions to a remote device for execution.

As illustrated in FIG. 6, exemplary computing system 600 may also include a primary storage device 632 and/or a backup storage device 634 coupled to communication infrastructure 612 via a storage interface 630. Storage devices 632 and 634 generally represent any type or form of storage device or medium capable of storing data and/or other computer-readable instructions. For example, storage devices 632 and 634 may represent a magnetic disk drive (e.g., a so-called hard drive), a solid state drive, a floppy disk drive, a magnetic tape drive, an optical disk drive, a flash drive, or the like. Storage interface 630 generally represents any type or form of interface or device for transferring data between storage devices 632 and 634 and other components of computing system 600.

In certain embodiments, storage devices 632 and 634 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 634 may also include other similar structures or devices for allowing computer software, data, or other computer-readable instructions to be loaded into computing system 600. For example, storage devices 632 and 634 may be configured to read and write software, data, or other computer-readable information. Storage devices 632 and 634 may be a part of computing system 600 or may be separate devices accessed through other interface systems.

Many other devices or subsystems may be connected to computing system 600. Conversely, all of the components and devices illustrated in FIG. 6 need not be present to practice the embodiments described and/or illustrated herein. The devices and subsystems referenced above may also be interconnected in different ways from those shown in FIG. 6. Computing system 600 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
   determining that a packet traversing a network device has been selected for conditional tracing by:
      comparing at least one characteristic of the packet against at least one firewall rule that calls for all packets exhibiting the characteristic to be conditionally traced while traversing the network device; and
      determining, based at least in part on the comparison, that the firewall rule applies to the packet due at least in part to the packet exhibiting the characteristic;
   in response to the determination that the packet has been selected for the conditional tracing, tracing a journey of the packet within the network device by collecting information about the packet's journey through a network stack of the network device; and
   modifying, based at least in part on the information collected about the packet's journey, code included in a function called in connection with the packet while traversing the network stack.

2. The method of claim 1, further comprising, prior to comparing the characteristic of the packet against the firewall rule:
   detecting a computing event of interest in connection with at least one additional packet traversing the network device;
   determining that the additional packet exhibits the characteristic; and
   in response to detecting the computing event of interest and determining that the additional packet exhibits the characteristic, creating the firewall rule that calls for all packets exhibiting the characteristic to be conditionally traced while traversing the network device.

3. The method of claim 2, wherein creating the firewall rule comprises installing the firewall rule in a firewall utility of an operating system running on the network device.

4. The method of claim 2, wherein the firewall rule comprises at least one of:
   an identifier used to determine whether to conditionally trace packets traversing the network device; and
   a directive indicating which information to collect about the packet's journey through the network stack.

5. The method of claim 4, wherein tracing the journey of the packet within the network device comprises marking, via at least one hook, a field of the packet with the identifier such that the packet's journey is traced within the network device due at least in part to the identifier.

6. The method of claim 2, wherein the computing event of interest comprises an unexpected drop of the additional packet traversing the network device.

7. The method of claim 1, wherein tracing the journey of the packet within the network device comprises:
   executing at least one function in connection with the packet; and
   collecting, via the function, at least a portion of the information about the packet's journey through the network stack.

8. The method of claim 7, further comprising adding, in connection with the firewall rule, a call to the function within the network stack to facilitate conditionally tracing all packets exhibiting the characteristic while traversing the network device.

9. The method of claim 1, wherein:
   the information identifies one or more function calls made in connection with the packet as the packet traverses the network stack; and
   tracing the journey of the packet within the network device comprises:
      logging the information as the packet traverses the network stack; and
      providing the information to a debug tool for analysis.

10. The method of claim 9, wherein the information comprises one or more backtraces of the function calls made in connection with the packet as the packet traverses the network stack.

11. The method of claim 1, further comprising establishing one or more tracing points throughout the network stack; and
   wherein tracing the journey of the packet within the network device comprises:
      collecting at least a portion of the information about the packet's journey through the network stack at one of the tracing points; and
      collecting at least one additional portion of the information about the packet's journey through the network stack at another one of the tracing points.

12. The method of claim 1, further comprising performing at least one action on the network device based at least in part on the information collected about the packet's journey through the network stack, wherein the action:
   fixes at least one software bug of the network device; or
   improves at least one performance feature of the network device.

13. A system comprising:
   a firewall module, stored in memory, that determines that a packet traversing a network device has been selected for conditional tracing by:
      comparing at least one characteristic of the packet against at least one firewall rule that calls for all packets exhibiting the characteristic to be conditionally traced while traversing the network device; and
      determining, based at least in part on the comparison, that the firewall rule applies to the packet due at least in part to the packet exhibiting the characteristic;
   a tracing module, stored in memory, that traces, in response to the determination that the packet has been selected for the conditional tracing, a journey of the packet within the network device by collecting information about the packet's journey through a network stack of the network device;
   a remedy module, stored in memory, that modifies, based at least in part on the information collected about the packet's journey, code included in a function called in connection with the packet while traversing the network stack; and
   at least one physical processor configured to execute the determination module, the tracing module, and the remedy module.

14. The system of claim 13, wherein the firewall module:
- detects a computing event of interest in connection with at least one additional packet traversing the network device;
- determines that the additional packet exhibits the characteristic; and
- creates, in response to detecting the computing event of interest and determining that the additional packet exhibits the characteristic, the firewall rule that calls for all packets exhibiting the characteristic to be conditionally traced while traversing the network device.

15. The system of claim 14, wherein the firewall rule comprises at least one of:
- an identifier used to determine whether to conditionally trace packets traversing the network device; and
- a directive indicating which information to collect about the packet's journey through the network stack.

16. The system of claim 15, wherein tracing the journey of the packet within the network device comprises marking, via at least one hook, a field of the packet with the identifier such that the packet's journey is traced within the network device due at least in part to the identifier.

17. The system of claim 14, wherein the computing event of interest comprises an unexpected drop of the additional packet traversing the network device.

18. The system of claim 13, wherein the tracing module:
- executes at least one function in connection with the packet; and
- collects, via the function, at least a portion of the information about the packet's journey through the network stack.

19. The system of claim 18, wherein the tracing module adds, in connection with the firewall rule, a call to the function within the network stack to facilitate conditionally tracing all packets exhibiting the characteristic while traversing the network device.

20. A non-transitory computer-readable medium comprising one or more computer-executable instructions that, when executed by at least one processor of a computing device, cause the computing device to:
- determine that a packet traversing a network device has been selected for conditional tracing by:
  - comparing at least one characteristic of the packet against at least one firewall rule that calls for all packets exhibiting the characteristic to be conditionally tracing while traversing the network device; and
  - determining, based at least in part on the comparison, that the firewall rule applies to the packet due at least in part to the packet exhibiting the characteristic;
- trace, in response to the determination that the packet has been selected for the conditional tracing, a journey of the packet within the network device by collecting information about the packet's journey through a network stack of the network device; and
- modify, based at least in part on the information collected about the packet's journey, code included in a function called in connection with the packet while traversing the network stack.

\* \* \* \* \*

UNITED STATES PATENT AND TRADEMARK OFFICE
CERTIFICATE OF CORRECTION

| | |
|---|---|
| PATENT NO. | : 11,374,842 B1 |
| APPLICATION NO. | : 16/940422 |
| DATED | : June 28, 2022 |
| INVENTOR(S) | : Singh et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 36 days.

Signed and Sealed this
Eighteenth Day of February, 2025

Coke Morgan Stewart
*Acting Director of the United States Patent and Trademark Office*